United States Patent
Golpe et al.

(10) Patent No.: US 10,406,922 B2
(45) Date of Patent: Sep. 10, 2019

(54) CHARGING MODULE FOR AN ELECTRIC VEHICLE

(71) Applicant: TransTech of South Carolina, Inc., Piedmont, SC (US)

(72) Inventors: William Golpe, Taylors, SC (US); Stacy Neil Smith, Piedmont, SC (US); Steven Halbert, Greenville, SC (US)

(73) Assignee: TransTech of South Carolina, Inc., Piedmont, SC (US)

( * ) Notice: Subject to any disclaimer, the term of this patent is extended or adjusted under 35 U.S.C. 154(b) by 218 days.

(21) Appl. No.: 15/592,947

(22) Filed: May 11, 2017

(65) Prior Publication Data
US 2017/0326998 A1    Nov. 16, 2017

Related U.S. Application Data

(60) Provisional application No. 62/335,318, filed on May 12, 2016.

(51) Int. Cl.
| | |
|---|---|
| *H01M 10/46* | (2006.01) |
| *B60L 5/38* | (2006.01) |
| *B60L 5/40* | (2006.01) |
| *B60M 1/04* | (2006.01) |
| *B60M 1/30* | (2006.01) |

(52) U.S. Cl.
CPC ............ *B60L 5/38* (2013.01); *B60L 5/40* (2013.01); *B60M 1/04* (2013.01); *B60M 1/30* (2013.01); *B60L 2200/26* (2013.01); *Y02T 90/16* (2013.01)

(58) Field of Classification Search
CPC ........ H02J 7/0042; H02J 7/355; H02J 7/0021; H02J 7/0026; H02J 7/0027
USPC .......... 320/104, 107, 109; 180/7.1, 44, 110, 180/120, 121
See application file for complete search history.

(56) References Cited

U.S. PATENT DOCUMENTS

| | | | |
|---|---|---|---|
| 8,851,253 B2 * | 10/2014 | Asplund | B60L 5/42 191/29 R |
| 2010/0005997 A1 * | 1/2010 | Tozoni | B60L 13/10 104/283 |
| 2011/0196561 A1 * | 8/2011 | Jorgensen | B60L 5/38 701/23 |
| 2011/0278079 A1 * | 11/2011 | Stoicoviciu | B60L 5/005 180/2.1 |
| 2013/0154553 A1 * | 6/2013 | Steele | B60L 11/182 320/108 |
| 2015/0246614 A1 * | 9/2015 | Dames | B60L 5/005 191/10 |

* cited by examiner

*Primary Examiner* — Edward Tso
(74) *Attorney, Agent, or Firm* — The Webb Law Firm

(57) ABSTRACT

A charging module for an electric vehicle includes an enclosure having a plurality of sides and an at least partially open top, the enclosure defining a hollow interior; a conductor rail disposed in the at least partially open top of the enclosure, the conductor rail being configured to be placed in electric communication with an electrical power source; and at least one external insulator disposed in the at least partially open top of the enclosure adjacent to the conductor rail. The at least one external insulator is disposed between the conductor rail and at least one of the sides of the enclosure. The conductor rail is configured to transmit electrical energy from the electrical power source to the electric vehicle.

18 Claims, 4 Drawing Sheets

CHARGING MODULE FOR AN ELECTRIC VEHICLE

CROSS-REFERENCE TO RELATED APPLICATION

The present application claims priority from U.S. Provisional Patent Application No. 62/335,318, filed on May 12, 2016, which is hereby incorporated by reference in its entirety.

BACKGROUND OF THE INVENTION

Field of the Invention

The invention relates to a charging module for an electric vehicle. In particular, the invention relates to an in ground charging module that connects an electric vehicle with an electrical power source for re-charging.

Description of Related Art

Several techniques have been used to convey power to electric vehicles, particularly public transit vehicles, such as buses, trains, subways, and trolleys. Frequently, trains and subways run on tracks accompanied by a third rail that conveys electric power to the vehicle. Electric buses and trolleys frequently travel on or alongside streets and cannot make use of a third rail due to the presence of pedestrians and other types of vehicles. Typically, these electric vehicles are powered via overhead catenary wires strung above the street or trolley tracks. The electric bus or trolley includes a collector extending above the vehicle to contact the catenary wires as the vehicle travels.

The use of catenary wires presents several issues with respect to powering an electric vehicle. The vehicle must be in constant or frequent contact with the wires so that the wires must be strung along larger distances. The wires are unsightly and disrupt the appearance of the street or neighborhood in which they are strung and act as a nuisance. Also, the wires are exposed to environmental elements and are, accordingly, prone to degradation and failure unless constantly maintained.

SUMMARY OF THE INVENTION

Generally, there is provided a charging module that can be disposed in a ground surface near or under the travel path of an electric vehicle, to which the electric vehicle can temporarily connect to quickly recharge the vehicle's battery before resuming its route without the use of overhead catenary wires. The charging module is a complete sealed and self-contained unit that can transfer electric current from an external power source to the vehicle.

According to one preferred and non-limiting embodiment of the present disclosure, a charging module for an electric vehicle is provided. The charging module includes an enclosure having a plurality of sides and an at least partially open top, the enclosure defining a hollow interior; a conductor rail disposed in the at least partially open top of the enclosure, the conductor rail being configured to be placed in electric communication with an electrical power source; and at least one external insulator disposed in the at least partially open top of the enclosure adjacent to the conductor rail, the at least one external insulator being disposed between the conductor rail and at least one of the sides of the enclosure. The conductor rail is configured to transmit electric current from the electrical power source to the electric vehicle.

In one preferred and non-limiting embodiment or aspect, the enclosure is configured to be installed in a ground surface.

In one preferred and non-limiting embodiment or aspect, the module further includes at least one mounting bracket configured to attach the enclosure to a support surface.

In one preferred and non-limiting embodiment or aspect, the enclosure extends along a longitudinal axis and the conductor rail, and the at least one external insulator extends side by side parallel to the longitudinal axis of the enclosure. The at least one external insulator is made from extruded rubber.

In one preferred and non-limiting embodiment or aspect, the at least one insulator includes two external insulators extending parallel to the longitudinal axis between the conductor rail and respective opposing sides of the enclosure. The external insulators are made from extruded rubber.

In one preferred and non-limiting embodiment or aspect, the enclosure includes a steel tube extending along the longitudinal axis defining bottom and lateral sides of the enclosure and insulated end plates disposed at the longitudinal ends of the steel tube.

In one preferred and non-limiting embodiment or aspect, the conductor rail includes a T-shaped plate and two conductive rods connected to and in contact with a depending portion of the T-shaped plate. The depending portion of the T-shaped plate is disposed between the two conductive rods. The two conductive rods are configured to place the T-shaped plate in electrical communication with the electrical power source. The T-shaped plate is configured to be engaged with a collector of the electric vehicle. The T-shaped plate is made from stainless steel and the two conductive rails are made from aluminum.

In one preferred and non-limiting embodiment or aspect, the module further includes a plurality of insulator elements disposed within the hollow interior of the enclosure. The insulator elements engage the conductor rail to support the conductor rail and to isolate the conductor rail from the sides of the enclosure. The insulator elements are made from a fiberglass material.

In one preferred and non-limiting embodiment or aspect, the module further includes at least one feeder connection configured to connect the module to the electrical power source. The feeder connection is in electrical communication with the conductor rail. The at least one feeder connection is disposed in a side of the enclosure. The at least one feeder connection includes feeder lugs configured to connect with different sized power cables. The at least one feeder connection further includes a rubber grommet disposed in the side of the enclosure surrounding the feeder lugs.

In one preferred and non-limiting embodiment or aspect, the at least one feeder connection includes at least two feeder connections disposed in opposing sides of the enclosure.

In one preferred and non-limiting embodiment or aspect, the at least one external insulator is configured to engage the conductor rail and the enclosure to seal the enclosure.

Further details and advantages of the invention will become clear upon reading the following detailed description in conjunction with the accompanying drawing figures, wherein like parts are designated with like reference numerals throughout.

DETAILED DESCRIPTION OF THE INVENTION

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
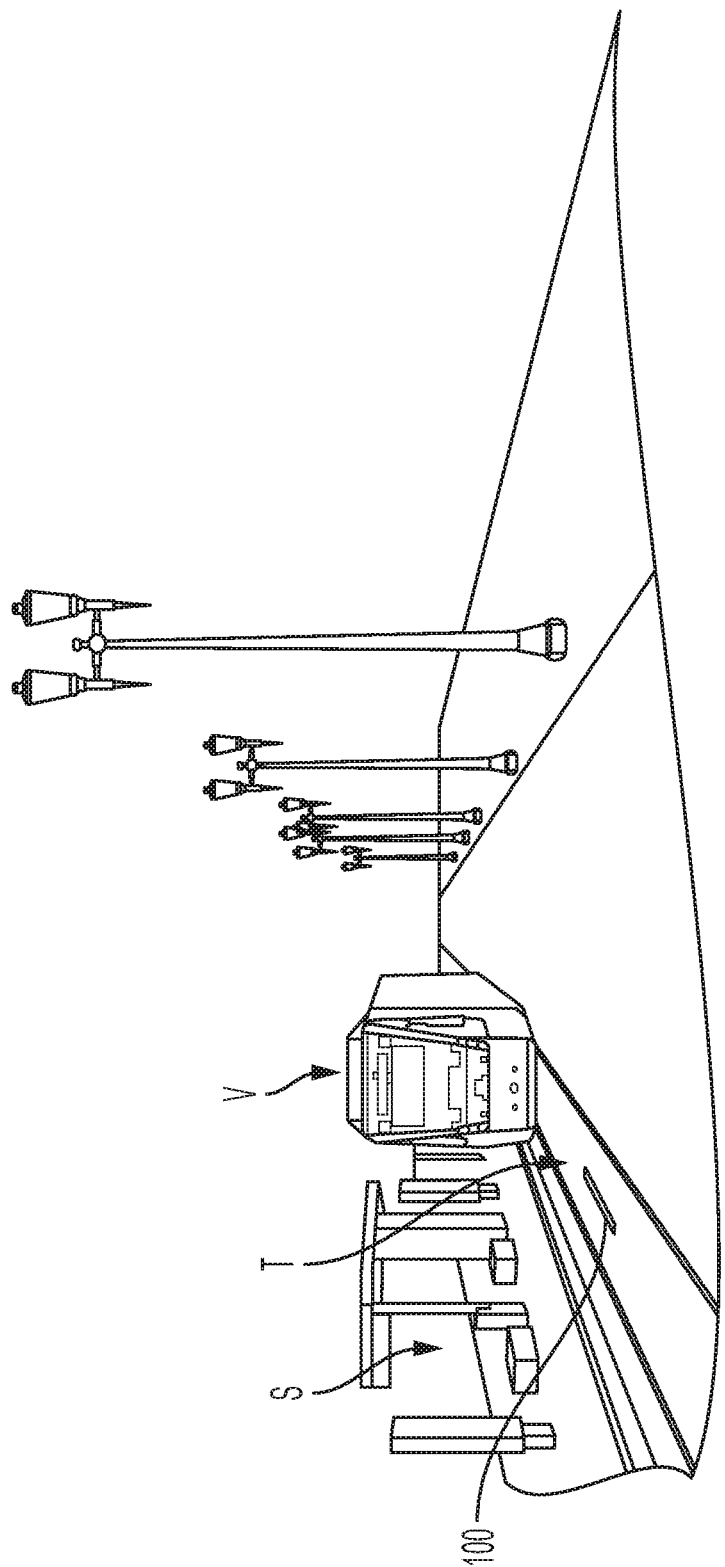
FIG. 1 depicts an exemplary system for charging an electric vehicle using an in ground charging module according to an embodiment of the present invention.

With reference to FIG. 1, an exemplary system for charging an electric vehicle V, such as an electric trolley or tram travelling along tracks T operating at street level, includes an in ground charging module 100 according to an embodiment of the present invention. As shown, the in ground charging module 100 is installed in the ground surface such that a top of the charging module 100 is level with the paved surface between the tracks T. The charging module 100 may be installed along the tracks T at or near a station S so that the vehicle V may connect to the charging module 100 to briefly charge its internal batteries while loading and unloading passengers or may idle at the station S during scheduled breaks in its route without interfering with automobile and pedestrian traffic in the surrounding streets and sidewalks. It is to be appreciated that the above-described system is exemplary and the charging module 100 may be placed in any location suitable for charging an electric vehicle V of any type.

Figure 2:
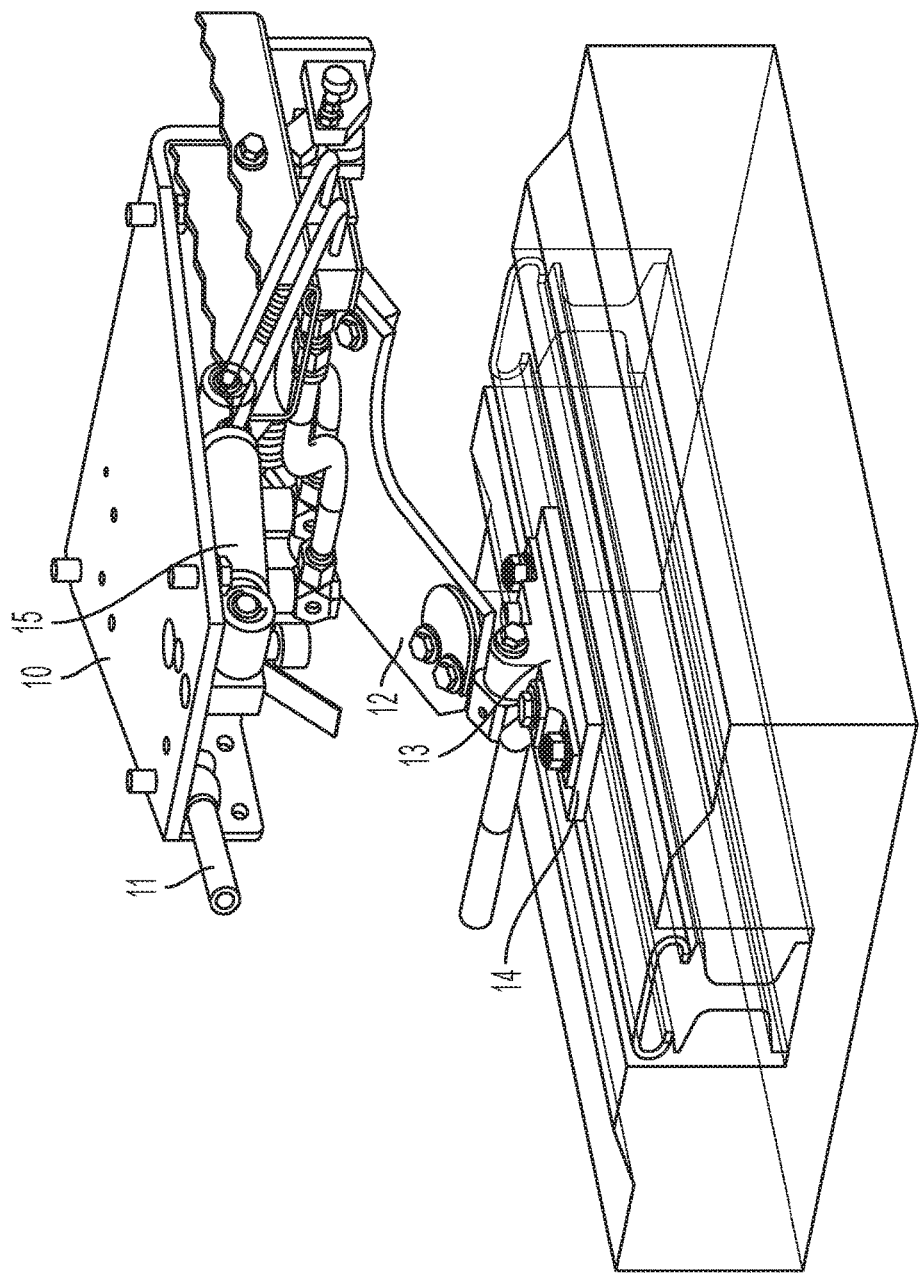
FIG. 2 depicts an exemplary collector for an electric vehicle.

With reference to FIG. 2, a collector arrangement for an electric vehicle V is disposed on the base frame 10 at the bottom of the electric vehicle V such that the electric vehicle V can be connected to the charging module 100 when it is positioned over the charging module 100. The arrangement includes a terminal 11 for electrically coupling the arrangement to the electric power system and battery of the electric vehicle V. A swing arm 12 is pivotably connected to the base frame 10 and is actuated by a hydraulic actuator 15 to rotate between a raised position near the base frame 10 and a lowered or deployed position for connecting to the charging module 100. A collector shoe 13 is connected to an end of the swing arm 12. The collector shoe 13 includes a copper contact 14 at its bottom. The collector shoe 13 is configured to establish an electrical connection between the electric power system of the electric vehicle V and the charging module 100 by engaging the charging module 100 with the copper contact 14 so that current is able to flow from the charging module 100 to the battery of the electric vehicle V.

Figure 3:
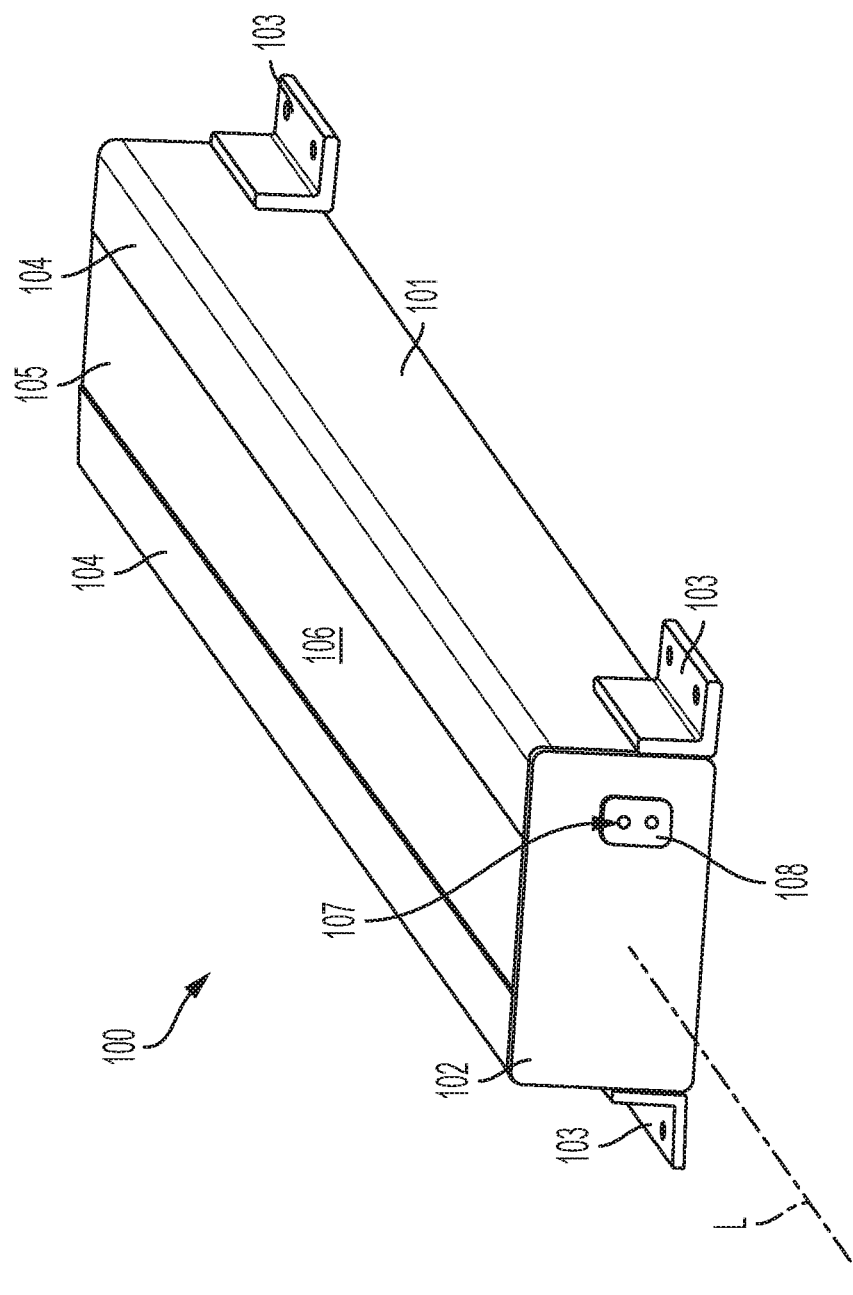
FIG. 3 depicts a perspective view of the charging module according to an embodiment of the present invention.
Figure 4:
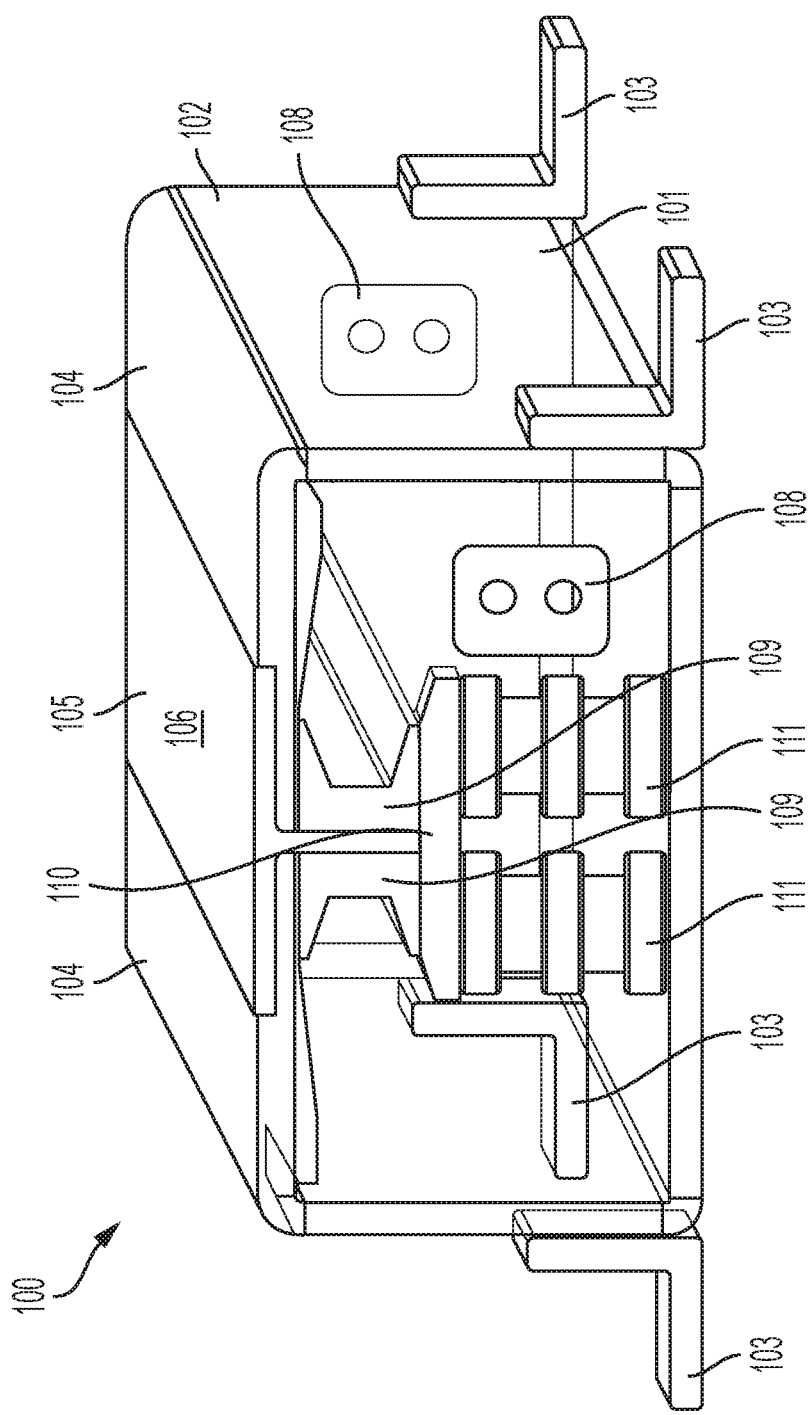
FIG. 4 depicts another perspective view of the charging module of FIG. 3 with some of the sides of the charging module rendered in phantom.

With reference to FIGS. 3 and 4, the charging module 100, according to a preferred and non-limiting embodiment of the present invention, includes an enclosure having a plurality of sides and an at least partially open top. The sides of the enclosure define a hollow interior for housing certain components of the charging module 100. In particular, the enclosure includes an open-topped steel tube 101 extending along a longitudinal axis L. The steel tube 101 of the enclosure defines the lateral sidewalls and the bottom of the enclosure. The enclosure also includes insulated end plates 102 disposed at the longitudinal ends of the steel tube 101. The charging module 100 also includes at least one mounting bracket 103 connected to the enclosure for connecting the charging module 100 to an in ground support surface. The mounting bracket 103 is fastened to the sides of the enclosure and to the ground support surface. As shown, the charging module 100 includes four mounting brackets 103 connected to the lateral sidewalls of the steel tube 101 near the end plates 102. It is to be appreciated that the mounting brackets 103 may be provided in any number and configuration known to be suitable to those having ordinary skill in the art for adequately fastening or connecting the charging module 100 to the ground support surface to prevent unintended movement or displacement of the charging module 100.

As shown in FIGS. 3 and 4, the charging module 100 also includes a conductor rail 105 disposed in the at least partially open top of the enclosure. The conductor rail 105 is placed in electric communication with an electrical power source, as will be discussed below. The conductor rail 105 is configured to be contacted by a collector of an electric vehicle, such as by the copper contact 14 on the collector shoe 13 of the collector arrangement discussed above with reference to FIG. 2, to transmit electric current from the electrical power source to the electric vehicle. The conductor rail 105 extends parallel or substantially parallel to the longitudinal axis L of the enclosure and includes a T-shaped plate and two conductive rods 109 connected to and in contact with a depending portion of the T-shaped plate. In particular, the depending portion of the T-shaped plate is disposed between the two conductive rods 109. The two conductive rods 109 are connected to the electrical power source and place the T-shaped plate in electrical communication with the electrical power source. The conductive rods 109 are shaped such that they can be directly fastened to the T-shaped plate via a huck bolt. The T-shaped plate defines a top surface 106 that is configured to be engaged with the collector of the electric vehicle, such as by the copper contact 14 of the collector arrangement discussed above.

According to a preferred and non-limiting embodiment or aspect of the invention, the T-shaped plate is made from stainless steel of sufficient grade to be adequately conductive and corrosion resistant and the conductive rods 109 are made from aluminum. The aluminum conductive rods 109 have a higher conductivity than the stainless steel T-shaped plates so that the charging module 100 is able to meet the electrical requirements for recharging the electric vehicle V. It is to be appreciated, however, that the T-shaped plate and conductive rods 109 can be made from any materials known to be suitable to those having ordinary skill in the art.

As shown in FIGS. 3 and 4, the charging module 100 also includes at least one external insulator 104 disposed in the at least partially open top of the enclosure adjacent to the conductive rail 105. The at least one external insulator 104 is disposed between the conductor rail 105 and at least one side of the enclosure. The at least one external insulator 104 engages the conductor rail 105 and the sides of the enclosure to seal the enclosure. In particular, the at least one external insulator 104 extends side by side with the conductor rail 105 parallel to the longitudinal axis L of the enclosure in order to separate the conductor rail 105 from the lateral sides of the steel tube 101. As shown, the at least one external insulator 104 includes two external insulator strips 104 extending parallel to the longitudinal axis L between the conductor rail 105 and respective opposing lateral sides of the steel tube 101 of the enclosure. According to a preferred and non-limiting embodiment or aspect of the present invention, the external insulators 104 are made from strips of extruded rubber. The external insulator strips 104 are profiled to engage and connect to the sides of the steel tube 101 and to engage and connect to the T-shaped plate of the conductor rail 105. As shown in FIG. 4, the external insulator strips 104 extend between the tops of the conductive rods 109 and the internal or bottom surface of the top portion of the T-shaped plate to electrically isolate the top portion of the T-shaped plate from the conductive rods 109.

The external insulators 104 are also arranged and configured to close and seal the at least partially open top of the steel tube 101 to prevent the buildup of debris and other contaminants in the enclosure. However, the enclosure of the charging module 100 need not be sealed so as to be water tight and some water may seep around the external insulator strips 104. Accordingly, weep or drainage holes may be provided in the bottom of the steel tube 101 to allow for drainage of moisture from the enclosure.

As shown in FIG. 4, the charging module 100 also includes a plurality of insulator elements 110, 111 disposed within the hollow interior of the enclosure. The insulator elements 110, 111 engage the conductor rail 105 to support the conductor rail 105 and to isolate the conductor rail 105 from the sides of the enclosure. In particular, the insulator elements 110, 111 include at least one rail clamp 110 positioned directly beneath and secured to the conductor rail 105 and configured to assist in clamping the conductive rods 109 with the dependent portion of the T-shaped plate. The insulator elements 110, 111 also include at least two of insulator standoffs 111 fixed to the bottom of the steel tube 101 of the enclosure. The conductor rail 105 is mounted on top of the rail clamp 110 and insulator standoffs 111, which support the conductor rail 105 such that the conductor rail 105 is positioned in the at least partially open top of the enclosure. The rail clamps 110 and insulator standoffs 111 also electrically isolate the conductor rail 105 to prevent loss of current from the conductor rail 105 through the enclosure. The rail clamps 110 and insulator standoffs 111 are also configured to be connected or fastened to each other. As shown, the charging module 100 includes two rail clamps 110 and four insulator standoffs 111 arranged so that one rail clamp 110 and two insulator standoffs 111 are positioned at each of the opposing longitudinal ends of the conductor rail 105. According to one preferred and non-limiting embodiment or aspect of the invention, the rail clamps 110 and insulator standoffs 111 are made from a fiberglass material.

As shown in FIGS. 3 and 4, the charging module 100 also includes at least one feeder connection 107 disposed in a side of the enclosure. The at least one feeder connection 107 is configured to connect the charging module 100 to the electrical power source. The at least one feeder connection 107 is electrically connected and in communication with the conductive rods 109 of the conductor rail 105 via electrical cables, wires, and/or terminals (not shown) disposed between the conductive rods 109 and the at least one feeder connection 107. In particular, as shown in FIG. 4, the charging module 100 includes two feeder connections 107 disposed in the opposing insulated end plates 102 of the enclosure. Each feeder connection 107 is separately connected to the conductive rods 109 of the conductor rail 105. Each feeder connection 107 includes feeder lugs that are configured to connect to different sizes of power cables. The feeder connections 107 also each include a rubber grommet 108 disposed in the respective end plates 102 of the enclosure. The rubber grommet 108 surrounds the feeder lugs to support and protect the feeder lugs. Accordingly, the charging module 100 is configured to connect to the external power source via a power cable (not shown) coupled to the feeder connections 107. The power cables may form part of a dedicated power line extending along the tracks or route of the electric vehicle, which is controlled and operated by the transit authority or company operating the electric vehicle. Further, multiple charging modules 100 may be electrically connected in series via the feeder connections 107 to achieve charging modules 100 of greater effective length.

As discussed above, the charging module 100 is configured to be installed in a ground surface with the enclosure buried and levelled such that the top surface 106 of the conductor rail 105 is disposed at or near the ground surface for connection to the electric vehicle. The charging module 100 is buried in place on the in ground support surface by the mounting brackets 103, which may be configured to accommodate the height tolerance requirement for the charging module 100. Also as discussed, the charging module 100 is designed to be sealed and self-contained to prevent or limit contaminants from entering the enclosure. The external insulators 104, end walls 102, grommets 108, and internal insulator elements 110, 111 also serve to electrically insulate the charging module 100, particularly the conductor rail 105, to limit or prevent the loss of current from transmission to the vehicle via the conductor rail 105.

According to one embodiment or aspect of the present invention, the charging module 100 may further include heating elements (not shown) that run along the intersection between the top portion and the depending portion of the T-shaped plate between the external insulators 104. The heating elements are configured to prevent freezing over of the top surface 106 of the T-shaped plate, which may interfere with establishing a proper electrical connection between the conductor rail 105 and the collector of the electric vehicle.

According to one embodiment or aspect of the present invention, the charging module 100 is configured such that electric current is delivered to the conductor rail 105 when a collector of an electric vehicle is in contact with the conductor rail 105. For instance, the charging module 100 may incorporate a switch that responds to a sensor on the charging module 100 or to a signal from the electric vehicle via the collector and the conductor rail 105 to allow current from the external power source to the conductor rail 105. In this manner, current to the conductor rail 105 is shut off and the charging module 100 is rendered inert unless the collector of the electric vehicle is in engagement with the charging module 100. Accordingly, accidental electrocution of pedestrians and animals coming into contact with the charging module 105 can be prevented. When an electric vehicle is positioned to be charged by the charging module 100, the switch is opened to allow the conductor rail 105 to be energized to transmit current to the electric vehicle via the collector. When charging is complete, the collector is retracted, as discussed above, and disconnected from the conductor rail 105, thus causing the switch to close and render the charging module 100 inert.

While specific embodiments of the invention have been described in detail, it will be appreciated by those having ordinary skill in the art that various modifications and alternatives to those details could be developed in light of the overall teachings of the disclosure. The presently preferred embodiments described herein are meant to be illustrative only and not limiting as to the scope of the invention, which is to be given the full breadth of the appended claims and any and all equivalents thereof.

The invention claim is:

1. A charging module for an electric vehicle, comprising:
    an enclosure having a plurality of sides and an at least partially open top, the enclosure defining a hollow interior;
    a conductor rail disposed in the at least partially open top of the enclosure, the conductor rail being configured to be placed in electric communication with an electrical power source; and
    at least one external insulator disposed in the at least partially open top of the enclosure adjacent to the conductor rail, the at least one external insulator being disposed between the conductor rail and at least one of the sides of the enclosure,
    wherein the conductor rail is configured to transmit electric current from the electrical power source to the electric vehicle.

2. The charging module according to claim 1, wherein the enclosure is configured to be installed in a ground surface.

3. The charging module according to claim 1, further comprising at least one mounting bracket configured to attach the enclosure to a support surface.

4. The charging module according to claim 1, wherein the enclosure extends along a longitudinal axis and the conductor rail and the at least one external insulator extend side by side parallel to the longitudinal axis of the enclosure.

5. The charging module according to claim 4, wherein the at least one insulator comprises two external insulators extending parallel to the longitudinal axis between the conductor rail and respective opposing sides of the enclosure.

6. The charging module according to claim 5, wherein the external insulators are made from extruded rubber.

7. The charging module according to claim 1, wherein the at least one external insulator is made from extruded rubber.

8. The charging module according to claim 1, wherein the enclosure comprises a steel tube extending along the longitudinal axis defining bottom and lateral sides of the enclosure and insulated end plates disposed at the longitudinal ends of the steel tube.

9. The charging module according to claim 1, wherein the conductor rail comprises a T-shaped plate and two conductive rods connected to and in contact with a depending portion of the T-shaped plate, wherein the depending portion of the T-shaped plate is disposed between the two conductive rods, wherein the two conductive rods are configured to place the T-shaped plate in electrical communication with the electrical power source, and wherein the T-shaped plate is configured to be engaged with a collector of the electric vehicle.

10. The charging module according to claim 9, wherein the T-shaped plate is made from stainless steel and the two conductive rails are made from aluminum.

11. The charging module according to claim 1, further comprising a plurality of insulator elements disposed within the hollow interior of the enclosure, wherein the insulator elements engage the conductor rail to support the conductor rail and to isolate the conductor rail from the sides of the enclosure.

12. The charging module according to claim 11, wherein the insulator elements are made from a fiberglass material.

13. The charging module according to claim 1, further comprising at least one feeder connection configured to connect the module to the electrical power source, wherein the feeder connection is in electrical communication with the conductor rail.

14. The charging module according to claim 13, wherein the at least one feeder connection is disposed in a side of the enclosure.

15. The charging module according to claim 14, wherein the at least one feeder connection comprises feeder lugs configured to connect with different sized power cables.

16. The charging module according to claim 15, wherein the at least one feeder connection further comprises a rubber grommet disposed in the side of the enclosure surrounding the feeder lugs.

17. The charging module according to claim 14, wherein the at least one feeder connection comprises at least two feeder connections disposed in opposing sides of the enclosure.

18. The charging module according to claim 1, wherein the at least one external insulator is configured to engage the conductor rail and the enclosure to seal the enclosure.

* * * * *